Figure 1:
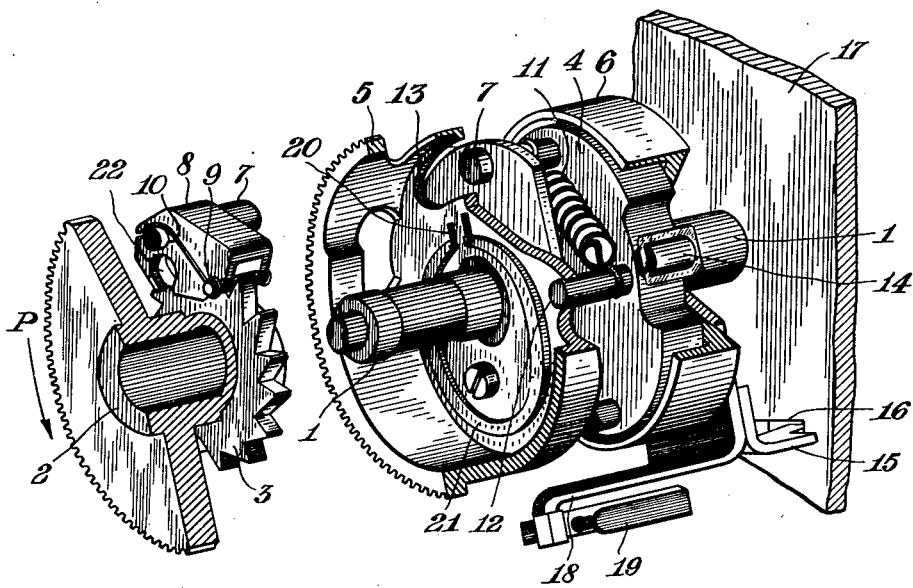

Nov. 17, 1953  J. M. UNK  2,659,469
OVERLOAD RELEASE COUPLING AND CONTROL OPERATED THEREBY
Filed Sept. 28, 1948  2 Sheets-Sheet 1

INVENTOR.
JACOB MARINUS UNK
BY
Stenderoth, Lind & Ponack
ATTORNEYS

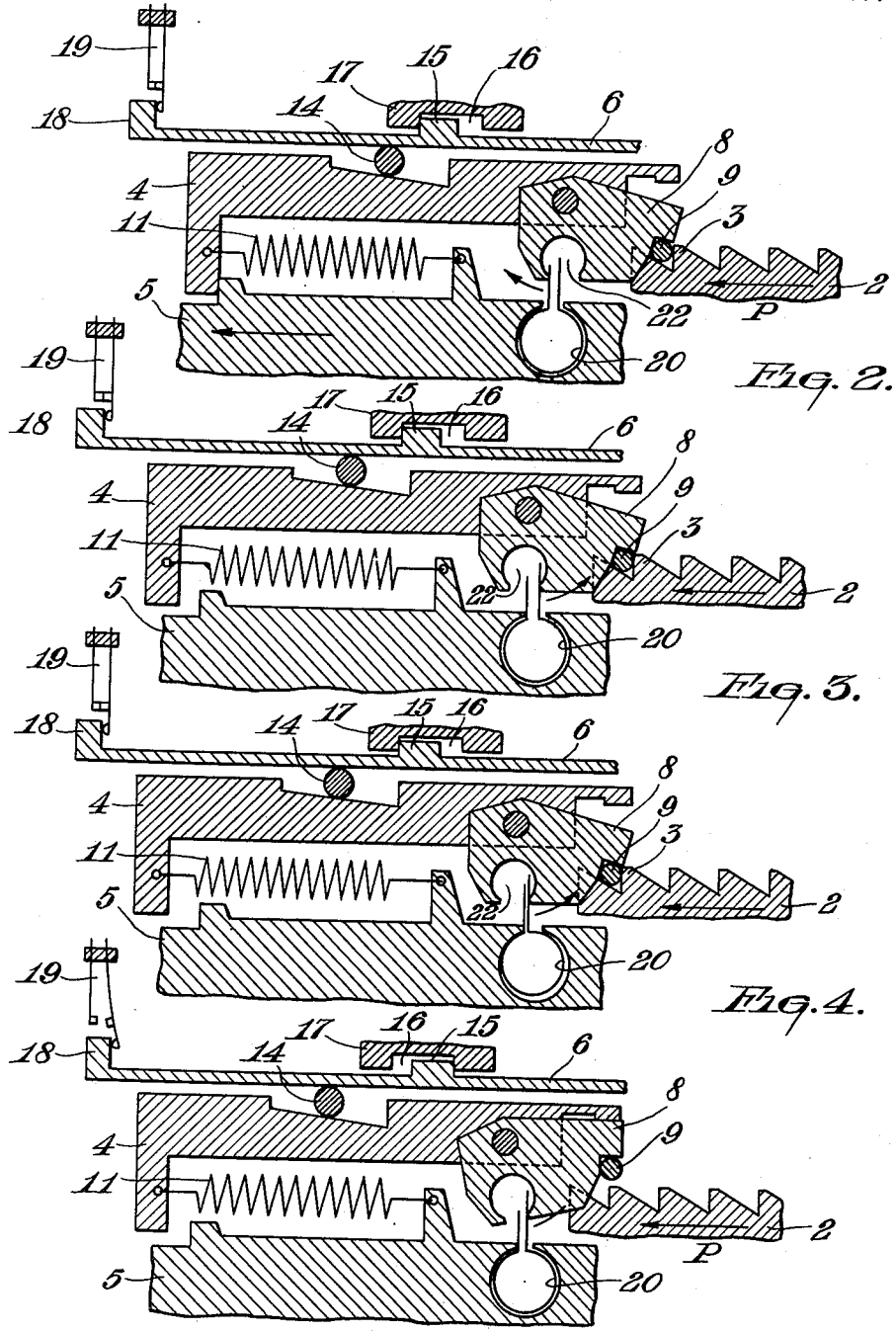

Patented Nov. 17, 1953

2,659,469

UNITED STATES PATENT OFFICE 2,659,469

OVERLOAD RELEASE COUPLING AND CONTROL OPERATED THEREBY

Jacob Marinus Unk, Eindhoven, Netherlands, assignor to Hartford National Bank and Trust Company, Hartford, Conn., as trustee Application September 28, 1948, Serial No. 51,604

Claims priority, application Netherlands October 4, 1947

11 Claims. (Cl. 192—150)

1

This invention relates to a device for coupling a driving shaft with a driven shaft, in which the couple is transmitted through the intermediary of an auxiliary member which is connected to the driven shaft by means of one or more springs and to the driving shaft by a coupling (maximum coupling) which due to the relative rotation of the driven shaft with respect to the auxiliary member on overloading of the driven shaft is disengaged and so remains during overloading, since a second coupling (arresting coupling) between the auxiliary member and a part (arresting member) not following the rotation of the shafts, is engaged and prevents the auxiliary member from returning to such an extent that the maximum coupling is engaged which arresting coupling is disengaged on termination of the overloading.

A coupling of this type has been described, for instance in French patent specification 903,072.

Such a coupling may more particularly be used for driving a shaft with which a tuning element of a radio-transmitting or receiving device is coupled and which shaft is adapted to be arrested by means of pawls in an arbitrary position out of a number of predetermined positions.

The invention has for its object to provide a device of the said kind in which, on disengaging and establishing the connection between the shafts to be coupled, a movement which may be used for controlling one or more other members is derived from a component part of the device.

According to the invention the arresting member is movable and this member cooperates with a stationary part which permits the first-mentioned member to perform a stroke of limited length only without engaging the maximum coupling. On disengaging the coupling between the auxiliary member and the driving shaft and the subsequent engagement of the coupling between the auxiliary member and the arresting member the latter is actuated by the tension of the spring connecting the auxiliary member to the driven shaft, but this movement is terminated, owing to cooperation between the arresting member and the stationary part, before the auxiliary member moves back to such an extent as to re-establish the coupling between the auxiliary member and the driving shaft.

In a suitable form of construction the arresting member may perform rotation about a shaft which coincides with the centre line of at least one of the shafts to be coupled. This yields a compact construction.

Limitation of the stroke of the arresting mem-

2 ber may, for instance, be ensured by furnishing this member with a lug cooperating with a recess of the stationary part, e. g. a frame plate, the edges of the recess terminating the movement of the lug and consequently of the arresting member.

The movement of the arresting member upon overloading and annulment thereof may be used for operating one or more electrical contact devices. In these contact devices it is possible to use either make-contacts or break-contacts or both of them. The contact devices may, for instance, be used for controlling signalling devices or for controlling the driving device for the ingoing shaft of the device according to the invention.

The moment available for actuating the arresting member corresponds approximately to the couple to be transmitted maximally. As a rule, a comparatively high contact pressure will consequently be obtainable.

Besides electrical contact devices also other members are adapted to be controlled by the movement of the arresting member, for instance mechanical signalling devices, counting devices, regulating systems of hydraulic control devices and the like.

Figure 6:
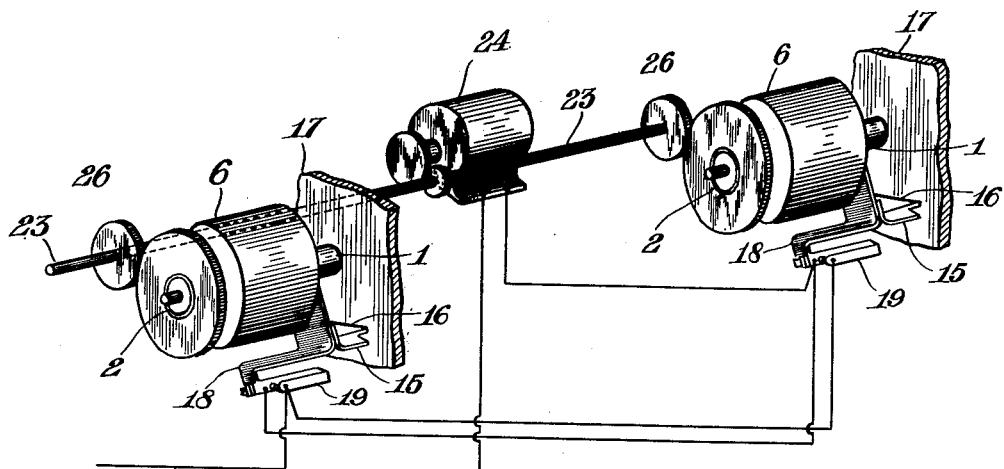

In order that the invention will be clearly understood and readily carried into effect it will now be described more fully by reference to the accompanying drawing, given by way of example, in which:

Fig. 1 is a perspective view of one form of the invention with some parts removed and others in partially exploded relationship;

Figs. 2 to 5, inclusive, illustrate diagrammatically the various relationships of parts during a complete operation of the device shown in Fig. 1; and Fig. 6 is a perspective view of an embodiment of the invention wherein a plurality of the devices shown in Fig. 1 are driven by means of a common driving means.

In Fig. 1 the reference numeral 1 denotes the control shaft of the device around which the driving shaft 2 and the toothed wheel 3 rigidly connected thereto, the auxiliary member 4, the cupshaped wheel 5 constituting the driven shaft and the housing 6 are freely rotatable. For the sake of clarity the driving shaft 2 is represented separately. The auxiliary member 4 is coupled with the toothed wheel 3 by means of a pawl which is pivoted on the pin 7 carried by the auxiliary member. The pawl consists of a gutter-shaped ratchet lever 8 carrying a roller 9. The roller 9 is pressed on the edges of the sides of the ratchet lever and the central part of the roller 9 cooperates with the toothed wheel 3. The ends of the roller 9 are caught by the spring 10 secured to the ratchet lever. Such a pawl device is described in U. S. Patent No. 2,487,733 to N. Scheffer entitled "Click Mechanism." The auxiliary member 4 is coupled with the wheel 5 through the intermediary of the tensioned spring 11, one end of which embraces the pin 7, whereas the other end is held by the pin 12 which is secured in the bottom of the wheel 5. The latter exhibits an aperture 13 through which extends the pin 7 and which permits a relative rotation between the auxiliary member 4 and the outgoing shaft 5 whereby the spring 11 is further stretched. Complete relaxation of spring 11 is prevented, since the pin 7 is arrested by a not represented part of the edge of the aperture 13.

Th auxiliary member 4 is provided at its periphery with a number of recesses each of which contains a grip roller 14. These grip rollers function as a coupling acting only in one direction of rotation between the auxiliary member 4 and the edge of the housing 6 embracing this auxiliary member. The housing 6 has rigidly secured to it the lug 15 which extends in the recess 16 of the stationary plate 17 in which the shaft 1 is supported. Owing to this the housing 6 is adapted to move around the shaft 1 only through a stroke determined by the cooperation between the lug 15 and the edges of the recess 16. To the housing 6 is also secured the arm 18, the end of which cooperates with one of the contact springs of the electrical contact device 19.

The driven shaft 5 comprises a spring 20 shaped as a wire or band which surrounds the shaft 1 and of which the ends extend in a radial direction, whereas the remaining part is stored in the hollow edge 21 provided on the shaft 5. The free ends of the spring 20 cooperate with the edges of one of the apertures 22 provided in the side walls of the ratchet lever 8 as will be set out in the following.

For explaining the operation of the device the latter is represented diagrammatically in Figs. 2 to 5, it being supposed, for the sake of clarity, that the separate members of the device perform a sliding movement instead of a rotating movement. The principle on which the invention is based is not affected thereby. In the following the expression "moments" will be used to bring out the applicability to the rotating movement though in conjunction with the imagined sliding movement the expression "forces" would be better. Any parts corresponding to these shown in Fig. 1 bear the same reference numerals.

In the position shown in Fig. 2, which corresponds to that shown in Fig. 1, the pawl 8 meshes with the toothed wheel 3. On the driving shaft 2 being moved in the direction indicated by the arrow $P_1$ the auxiliary member 4 is carried with and its movement is transmitted to the driven shaft 5 through the spring 11, the ratchet lever 8 and the roller 9 being compelled to cooperate with the toothed wheel 3 due to pressure exerted by the lefthand free end of the spring 20 on the edge of the aperture 22. The bottom of the recesses in the edge of the auxiliary member 4 containing the grip roller 14 extends in a manner such that in the direction of movement in question the auxiliary member is not coupled with the housing 6. The remaining slight friction provides that the housing occupies the extreme left-hand position which is adapted to occupy in connection with the abutment of the lug 15 against the edge of the recess 16. In this position of the housing 6 the contact device 19 is closed. The spring 11 is steadily given a preliminary tension by the stop (shown in Fig. 2 at the left) between the auxiliary member and the driven shaft 5, the operation of which stop corresponds with abutment of the pin 7 against the edge of the aperture (Fig. 1). As long as the driving moment remains smaller than the moment exerted by the preliminary tension of the spring, the relative positions of the auxiliary member 4 and the driven shaft 5 do not alter. If, however, the latter is overloaded or arrested, the auxiliary member 4 will leave the stop on the driven shaft and the spring 11 will be further stretched. The driven shaft 5 comes to a standstill, whereas the auxiliary member is further driven by the shaft 2. The point of application of the force exerted by spring 20 on the pawl 8 is shifted and at the same time this force reverses its direction, since, as shown in Fig. 3, the right free end of spring 20 engages the ratchet lever due to the relative movement of the auxiliary member and the driven shaft. The spring 20 tends to lift the pawl but does not succeed therein owing to the pressure exerted by the gear wheel 3 on the roller 9. The driving of the auxiliary member is as yet maintained, with the result that the relative displacement of the auxiliary member and the shaft 5 is increased until the other end of spring 20 also exerts pressure on the ratchet lever (Fig. 4). This results in that upon the auxiliary member 4 being further driven, the pressure exerted on the ratchet lever is sufficient for lifting the pawl the roller 9 passing both over the flank of the engaging tooth of the gear wheel 3 and over the sides of the ratchet lever 8 until the connection between the auxiliary member of the driving shaft 2 is completely broken. After that the auxiliary member only experiences a moment from the stretched spring 11 which tends to urge the member back. As soon, however, as such a movement begins the grip roller 14 seizes between the auxiliary member and the inner wall of the housing 6 due to which the housing is compelled to follow the returning auxiliary member. This is possible, since the lug 15 is movable in the recess 16 but only until it is arrested by the right-hand wall of the recess. At this moment the return of the housing 6 and consequently of the auxiliary member 4 coupled therewith by the grip roller 14 is terminated. The position then occupied is shown in Fig. 5. The return of the auxiliary member is terminated before the stretched spring 11 relaxes to its initial length so that a driving movement remains exerted on the driven shaft 5. The pawl 8 remains lifted, since although upon return of the auxiliary member the pressure exerted by the left end of spring 20 on the edge of the ratchet lever 8 has ceased, the right end of this spring exerts sufficient force to keep the ratchet lever upright. Upon the gear wheel 3 being released the roller 9 is caused to resume its initial position with respect to the ratchet lever 8 by the spring 10 shown in Fig. 1.

On the housing 6 being moved after actuation of the grip roller 14, the contact between the contact springs of the electrical contact device 19 is broken, since the arm 18 connected to the housing 6 has carried with it one of these springs. As the auxiliary member and the driving shaft 2 are no longer coupled the latter is adapted to move freely. This state is maintained as long as the driven shaft 5 is arrested or overloaded.

When the loading moment of this shaft decreases, so that it becomes smaller than the moment exerted by spring 11, relative displacement of the auxiliary member 4 and the driven shaft 5 takes place again but now because the shaft 5 is pulled near, as it were, by spring 11. Finally, upon this displacement of the shaft 5 the force exerted by spring 20 on the ratchet lever 8 changes its location and also its sign, so that the pawl and the roller are urged between the teeth gear wheel 3 and consequently the connection between the driving shaft 2 and the auxiliary member 4 is re-established. The spring 11 has relaxed until the auxiliary member 4 and the driven shaft 5 directly engage one another by means of the stop referred to, as a result of which the position shown in Fig. 2 is occupied again, and now the tension of spring 11 no longer affects the grip-roller coupling between the auxiliary member 4 and the housing 6, so that even a slight force is sufficient for urging the latter to its initial position, in which the cam 15 engaged the left side of the recess 16.

In the majority of cases the contact spring of the contact device 19 cooperating with the arm 18 is capable of performing this, if not an additional spring may be provided. The movement to the left of the housing 6 results in that the contact device 19 is closed and the device is completely in the state existing prior to overloading.

The contact device 19 may be used for regulating the driving of shaft 2. On driving to this end in the shaft 2 by means of an electric motor the contact device 19 is included a supply lead to the motor. Since upon overloading of the shaft 5 not only the connection between this shaft and the driving shaft 2 is broken, but also the contact of the contact device 19 is opened, the supply of energy to the motor is terminated upon overloading of the driven shaft, and the motor is allowed to slow down freely. When the overloading of the driven shaft ceases, the connection between the ingoing shaft and the outgoing shaft of the device is re-established and at the same time the contact of the contact device 19 is closed, so that the motor is restarted.

The present invention is particularly adaptable to arrangements wherein a plurality of separately stoppable devices are driven by a common driving means. Thus, as shown by way of example in Fig. 6, an electrically driven apparatus may comprise a number of devices of the aforesaid type illustrated in Figs. 1 to 5, inclusive, deriving their movement from a common driving shaft 23 via gears 26, 26, the driving motor 24 may advantageously be controlled by connecting the contacting devices 19 of the devices electrically in parallel and interposing them as such in the motor circuit 25. On overloading or arresting the outgoing shafts 1, 1 of the devices, which may, for instance, be used for driving a number of mechanisms for arresting accurately a tuning element for a radio transmitter or a radio receiving set (not shown) in a predetermined position, the breaking of the electrical contact 19 of the device of which the outgoing shaft 1 is arrested last of all causes the motor 24 to stop, whereas the motor 24 is restarted, upon release of any one or more of the outgoing shafts 1, 1.

What I claim is:

1. An automatically operated clutch mechanism comprising, in combination, a driving shaft, a driven shaft, a torque transmitting auxiliary member, spring means connecting said auxiliary member to said driven shaft, said spring means permitting relative rotative displacement between said auxiliary member and said driven shaft upon overloading of said driven shaft, first coupling means for coupling and uncoupling said auxiliary member to said driving shaft, means for governing said first coupling means, said last-named means being responsive to said relative rotative displacement, an arresting member, second coupling means for coupling and uncoupling said auxiliary member to said arresting member, said second coupling means being operative for checking said auxiliary member against movement thereof in the direction in which said relative rotative displacement between said auxiliary member and said driven shaft is diminished, after said first coupling means have initially become disengaged upon overloading of said driven shaft, said second coupling means being disengaged whenever said first coupling means is engaged, and vice versa, a stationary member, said arresting member being movably mounted with respect to said stationary member, means on said stationary member operatively associated with said arresting member for limiting the movement of said arresting member in either direction to a stroke of predetermined length, said stroke length being insufficient to permit, upon the second coupling means becoming operative, a retrograde movement of said auxiliary member coupled to said arresting member, whereby the relative rotative displacement between said auxiliary member and said overload subjected driven shaft may not be diminished to such an extent that the disengaged first coupling means is engaged again.

2. An automatically operated clutch mechanism comprising, in combination, a driving shaft, a driven shaft, a torque transmitting auxiliary member, spring means connecting said auxiliary member to said driven shaft, said spring means permitting relative rotative displacement between said auxiliary member and said driven shaft upon overloading of said driven shaft, first coupling means for coupling and uncoupling said auxiliary member to said driving shaft, means for governing said first coupling means, said last-named means being responsive to said relative rotative displacement, an arresting member, second coupling means for coupling and uncoupling said auxiliary member to said arresting member, said second coupling means being operative for checking said auxiliary member against movement thereof in the direction in which said relative rotative displacement between said auxiliary member and said driven shaft is diminished, after said first coupling means have initially become disengaged upon overloading of said driven shaft, said second coupling means being disengaged whenever said first coupling means is engaged, and vice versa, a stationary member, said arresting member being rotatably mounted with respect to said stationary member, means on said stationary member operatively associated with said arresting member for limiting the movement of said arresting member in either direction to a stroke of predetermined length, said stroke length being insufficient to permit, upon the second coupling means becoming operative, a retrograde movement of said auxiliary member coupled to said arresting member, whereby the relative rotative displacement between said auxiliary member and said overload subjected driven shaft may not be diminished to such an extent that the disengaged first coupling means is engaged again.

3. An automatically operated clutch mechanism comprising, in combination, a driving shaft, a driven shaft, a torque transmitting auxiliary member, spring means connecting said auxiliary member to said driven shaft, said spring means permitting relative rotative displacement between said auxiliary member and said driven shaft upon overloading of said driven shaft, first coupling means for coupling and uncoupling said auxiliary member to said driving shaft, means for governing said first coupling means, said last-named means being responsive to said relative rotative displacement, an arresting member, second coupling means for coupling and uncoupling said auxiliary member to said arresting member, said second coupling means being operative for checking said auxiliary member against movement thereof in the direction in which said relative rotative displacement between said auxiliary member and said driven shaft is diminished, after said first coupling means have initially become disengaged upon overloading of said driven shaft, said second coupling means being disengaged whenever said first coupling means is engaged, and vice versa, a stationary member, said arresting member being rotatably mounted with respect to said stationary member on an axis which coincides with the centre line of one of said shafts, means on said stationary member operatively associated with said arresting member for limiting the movement of said arresting member in either direction to a stroke of predetermined length, said stroke length being insufficient to permit, upon the second coupling means becoming operative, a retrograde movement of said auxiliary member coupled to said arresting member, whereby the relative rotative displacement between said auxiliary member and said overload subjected driven shaft may not be diminished to such an extent that the disengaged first coupling means is engaged again.

4. An automatically operated clutch mechanism comprising, in combination, a driving shaft, a driven shaft, a torque transmitting auxiliary member, spring means connecting said auxiliary member to said driven shaft, said spring means permitting relative rotative diplacement between said auxiliary member and said driven shaft upon overloading of said driven shaft, first coupling means for coupling and uncoupling said auxiliary member to said driving shaft, means for governing said first coupling means, said last-named means being responsive to said relative rotative displacement, arresting means comprising a lug, second coupling means for coupling and uncoupling said auxiliary member to said arresting member, said second coupling means being operative for checking said auxiliary member against movement theerof in the direction in which said relative rotative displacement between said auxiliary member and said driven shaft is diminished, after said first coupling means have initially become disengaged upon overloading of said driven shaft, said second coupling means being disengaged whenever said first coupling means is engaged, and vice versa, a stationary member provided with recess means, said lug of said arresting means being movably mounted within recess means on said stationary member, said recess means on said stationary member having edges thereof operatively associated with said lug for limiting the movement of said lug in either direction to a stroke of predetermined length, said stroke length being insufficient to permit, upon the second coupling means becoming operative, a retrograde movement of said auxiliary member coupled to said arresting member, whereby the relative rotative displacement between said auxiliary member and said overload subjected driven shaft may not be diminished to such an extent that the disengaged first coupling means is engaged again.

5. An automatically operated clutch mechanism comprising, in combination, a driving shaft, a driven shaft, a torque transmitting auxiliary member, spring means connecting said auxiliary member to said driven shaft, said spring means permitting relative rotative displacement between said auxiliary member and said driven shaft upon overloading of said driven shaft, first coupling means for coupling and uncoupling said auxiliary member to said driving shaft, means for governing said first coupling means, said last-named means being responsive to said relative rotative displacement, an arresting member, second coupling means for coupling and uncoupling said auxiliary member to said arresting member, said second coupling means being operative for checking said auxiliary member against movement thereof in the direction in which said relative rotative displacement between said auxiliary member and said driven shaft is diminished, after said first coupling means have initially become disengaged upon overloading of said driven shaft, said second coupling means being disengaged whenever said first coupling means is engaged, and vice versa, a stationary member, said arresting member being movably mounted with respect to said stationary member, means on said stationary member operatively associated with said arresting member for limiting the movement of said arresting member in either direction to a stroke of predetermined length, said stroke length being insufficient to permit, upon the second coupling means becoming operative, a retrograde movement of said auxiliary member coupled to said arresting member, and resilient means operatively associated with said stationary member and said arresting member for biasing said arresting member to the original position thereof assumed before overloading of said driven shaft.

6. An automatically operated clutch mechanism comprising, in combination, a driving shaft, a driven shaft, a torque transmitting auxiliary member, spring means connecting said auxiliary member to said driven shaft, said spring means permitting relative rotative displacement between said auxiliary member and said driven shaft, first coupling means for coupling and uncoupling said auxiliary member to said driving shaft, means for governing said first coupling means, said last-named means being responsive to said relative rotative displacement, an arresting member, second coupling means for coupling and uncoupling said auxiliary member to said arresting member, said second coupling means being operative for checking said auxiliary member against movement thereof in the direction in which said relative rotative displacement between said auxiliary member and said driven shaft is diminished, after said first coupling means have initially become disengaged upon overloading of said driven shaft, said second coupling means being disengaged whenever said first coupling means is engaged, and vice versa, a stationary member, said arresting member being movably mounted with respect to said stationary member, means on said stationary member operatively associated with said arresting member for limiting the movement of said arresting member in either direction to a stroke of predetermined length, said stroke length being insufficient to permit, upon the second coupling means becoming operative, a retrograde movement of said auxiliary member coupled to said arresting member, and an electrical contact device operatively associated with said arresting member to be actuatable thereby by movement thereof.

7. An automatically operated clutch mechanism comprising, in combination, a driving shaft, means for driving said driving shaft, a driven shaft, a torque transmitting auxiliary member, spring means connecting said auxiliary member to said driven shaft, said spring means permitting relative rotative displacement between said auxiliary member and said driven shaft upon overloading of said driven shaft, first coupling means for coupling and uncoupling said auxiliary member to said driving shaft, means for governing said first coupling means, said last-named means being responsive to said relative rotative displacement, an arresting member, second coupling means for coupling and uncoupling said auxiliary member to said arresting member, said second coupling means being operative for checking said auxiliary member against movement thereof in the direction in which said relative rotative displacement between said auxiliary member and said driven shaft is diminished, after said first coupling means have initially become disengaged upon overloading of said driven shaft, said second coupling means being disengaged whenever said first coupling means is engaged, and vice versa, a stationary member, said arresting member being movably mounted with respect to said stationary member, means on said stationary member operatively associated with said arresting member for limiting the movement of said arresting member in either direction to a stroke of predetermined length, said stroke length being insufficient to permit, upon the second coupling means becoming operative, a retrograde movement of said auxiliary member coupled to said arresting member, whereby the relative rotative displacement between said auxiliary member and said overload subjected driven shaft may not be diminished to such an extent that the disengaged first coupling means is engaged again, and means responsive to the movement of said arresting member for controlling the operative condition of said driving means for said driving shaft.

8. An automatically operated clutch mechanism comprising, in combination, a driving shaft, electrically driven means for driving said driving shaft, an electrical energy supply for said electrically driven means, a driven shaft, a torque transmitting auxiliary member, spring means connecting said auxiliary member to said driven shaft, said spring means permitting relative rotative displacement between said auxiliary member and said driven shaft upon overloading of said driven shaft, first coupling means for coupling and uncoupling said auxiliary member to said driving shaft, means for governing said first coupling means, said last-named means being responsive to said relative rotative displacement, an arresting member, second coupling means for coupling and uncoupling said auxiliary member to said arresting member, said second coupling means being operative for checking said auxiliary member against movement thereof in the direction in which said relative rotative displacement between said auxiliary member and said driven shaft is diminished, after said first coupling means have initially become disengaged upon overloading of said driven shaft, said second coupling means being disengaged whenever said first coupling means is engaged, and vice versa, a stationary member, said arresting member being movably mounted with respect to said stationary member, means on said stationary member operatively associated with said arresting member for limiting the movement of said arresting member in either direction to a stroke of predetermined length, said stroke length being insufficient to permit, upon the second coupling means becoming operative, a retrograde movement of said auxiliary member coupled to said arresting member, whereby the relative rotative displacement between said auxiliary member and said overload subjected driven shaft may not be diminished to such an extent that the disengaged first coupling means is engaged again, and electrical switch means actuatable by movement of said arresting member for controlling the electrical connection of said energy supply to said electrically driven means.

9. A coupling comprising a driving shaft; a toothed driving wheel integrally connected to said driving shaft; a driven shaft; means for transmitting motion from said driving shaft to said driven shaft; said means comprising a freely rotatable auxiliary wheel, a spring member connecting said auxiliary wheel to said driven shaft, means connecting said auxiliary wheel to said driving wheel, said latter means comprising a pawl pivoted on a pin which pin is secured to said auxiliary wheel, said pawl having a ratchet arm carrying a spring-biased roller which engages said toothed driving wheel; a biasing member mounted on said driven shaft for engagement with said pawl to urge said pawl toward said toothed driving wheel in one position of said driven shaft relative to said auxiliary wheel and to urge said pawl away from said toothed driving wheel in a second position of said driven shaft relative to said auxiliary wheel; an abutment on said driven shaft to limit the reverse movement of said auxiliary wheel relative to said driven shaft caused by the tensioning in the spring member thus maintaining a predetermined tension in the spring in its normal running position; a housing enclosing said auxiliary wheel; a recess in the periphery of said auxiliary wheel; a grip roller in said recess to allow relative rotation of said auxiliary wheel and said housing in one direction only; a stationary plate; said plate having an opening with spaced end walls therein; a first lug member secured to said housing and extending into said opening, the movement of this first lug member being limited by the end walls of the opening; a second lug member secured to said housing forcing an operative member for actuating an external member.

10. A coupling comprising a control shaft having rotatably mounted thereon in tandem, a driving wheel, a driven wheel and an auxiliary wheel for transmitting motion from said driving wheel to said driven wheel; a toothed-wheel integrally connected to said driving wheel; a spring member connecting said auxiliary wheel to said driven wheel; said driven wheel having an opening therethrough; means connecting said auxiliary member to said driving wheel; said means comprising a pawl pivoted on a pin which pin is secured to said auxiliary wheel and extends through said opening; said pawl having a ratchet arm carrying a spring-biased roller which engages said toothed-wheel, a biasing member mounted on said driven wheel for engagement with said pawl to urge said pawl toward said toothed-wheel in one position of said driven wheel relative to said auxiliary wheel and to urge said pawl away from said toothed-wheel in a second position of said driven wheel relative to said auxiliary wheel; an abutment on said driven wheel which engages said auxiliary member to limit reverse movement of said auxiliary member in order to maintain a predetermined tension in said spring member; a housing enclosing said auxiliary member; a recess in the periphery of said auxiliary member; a grip roller in said recess to allow relative rotation of said auxiliary member and said housing in one direction only; a stationary plate, said plate having an opening therein; a first lug member secured to said housing and extending into said plate opening, a second lug member secured to said housing and forming an operative member for actuating an external member.

11. A coupling comprising a control shaft having rotatably mounted thereon, a driving wheel; a driven wheel and an auxiliary wheel for transmitting motion from said driving wheel to said driven wheel; a toothed-wheel integrally connected to said driving wheel; stud pins mounted on said auxiliary wheel and said driven wheel; a spring member secured at opposite ends to said pins; means connecting said auxiliary member to said driving wheel; said driven wheel having an opening therethrough; said means comprising a pawl pivoted on a pin which pin is secured to said auxiliary wheel and extends through said opening; said pawl having a ratchet arm carrying a spring-biased roller which engages said toothed-wheel, a biasing member having two radially extending wires mounted on said driven wheel for engagement with said pawl, one wire urging said pawl toward said toothed-wheel in one position of said driven wheel relative to said auxiliary wheel and the other wire urging said pawl away from said toothed-wheel in a second position of said driven wheel relative to said auxiliary wheel; an abutment on said driven wheel which engages said auxiliary member to limit reverse movement of said auxiliary member in order to maintain a predetermined tension in said spring member; a housing enclosing said auxiliary member; a recess in the periphery of said auxiliary member; a grip roller in said recess between said auxiliary member and said housing to allow relative rotation of said auxiliary member and said housing in one direction only; a stationary plate; said plate having an opening with spaced end walls therein; a first lug member secured to said housing and extending into said plate opening, the movement of first lug member being limited by the end walls of said opening; a second lug member secured to said housing and forming a member for actuating an external member.

JACOB MARINUS UNK.

References Cited in the file of this patent
UNITED STATES PATENTS

| Number | Name | Date |
|---|---|---|
| 2,003,115 | Grohn | May 28, 1935 |
| 2,144,768 | Melmer | Jan. 24, 1939 |
| 2,175,047 | Acker | Oct. 3, 1939 |
| 2,208,119 | Chandler | July 16, 1940 |
| 2,256,781 | Nelson | Sept. 23, 1941 |
| 2,338,123 | Malone | Jan. 4, 1944 |
| 2,413,031 | Murch | Dec. 24, 1946 |

FOREIGN PATENTS

| Number | Country | Date |
|---|---|---|
| 416,840 | Germany | July 27, 1925 |